(12) United States Patent
Fu

(10) Patent No.: US 8,094,736 B2
(45) Date of Patent: Jan. 10, 2012

(54) APPARATUS AND METHOD FOR ESTIMATING NOISE POWER IN FREQUENCY DOMAIN

(75) Inventor: Po-Wei Fu, Taipei County (TW)

(73) Assignee: ITE Tech. Inc., Hsinchu (TW)

( * ) Notice: Subject to any disclaimer, the term of this patent is extended or adjusted under 35 U.S.C. 154(b) by 972 days.

(21) Appl. No.: 12/048,202

(22) Filed: Mar. 13, 2008

(65) Prior Publication Data

US 2008/0225998 A1    Sep. 18, 2008

(30) Foreign Application Priority Data

Mar. 13, 2007   (TW) .............................. 96108544 A

(51) Int. Cl.
*H04L 27/28*    (2006.01)

(52) U.S. Cl. ........ 375/260; 375/346; 702/111; 455/501; 455/63.1; 455/67.13; 455/296

(58) Field of Classification Search .................. 375/260, 375/346; 702/111; 455/501, 63.1, 67.13, 455/296

See application file for complete search history.

(56) References Cited

U.S. PATENT DOCUMENTS

| | | | |
|---|---|---|---|
| 6,456,653 B1 | 9/2002 | Sayeed | |
| 2004/0218519 A1* | 11/2004 | Chiou et al. | 370/203 |
| 2005/0169401 A1* | 8/2005 | Abraham et al. | 375/295 |
| 2006/0093074 A1 | 5/2006 | Chang et al. | |
| 2007/0021958 A1* | 1/2007 | Visser et al. | 704/226 |

* cited by examiner

*Primary Examiner* — Chieh M Fan
*Assistant Examiner* — L. M.
(74) *Attorney, Agent, or Firm* — Jianq Chyun IP Office

(57) ABSTRACT

An apparatus and a method for estimating noise power in frequency domain are provided. The apparatus and the method are applied to a state where no packet is transmitted over the channels. And the apparatus and the method acquire noise in every sub-carrier, and obtain the transmission status in every sub-channel to adjust bit-loading in every sub-carrier and improve the spectral-efficiency.

16 Claims, 6 Drawing Sheets

APPARATUS AND METHOD FOR ESTIMATING NOISE POWER IN FREQUENCY DOMAIN

CROSS-REFERENCE TO RELATED APPLICATION

This application claims the priority benefit of Taiwan application serial no. 96108544, filed on Mar. 13, 2007. The entirety the above-mentioned patent application is hereby incorporated by reference herein and made a part of specification.

BACKGROUND OF THE INVENTION

1. Field of the Invention

The present invention relates to an apparatus and a method for estimating noise power, and more particularly, to an apparatus and a method for estimating noise power in frequency domain.

2. Description of Related Art

In a communication system, noise in a channel is an important factor which effects the quality of a received signal. Thus, a transceiver will generally estimate noise or signal-to-noise ratio (SNR) and the like to determine internal algorithm parameters, such that the algorithm processing can obtain the optimum efficiency in the noise environment.

With the development for communication techniques, more and more data bits being transmitted in a limited bandwidth. To improve the spectral-efficiency, communication system with multiple carriers have been developed, such as a frequency division multiplexing (FDM) system and an orthogonal frequency division multiplex (OFDM) system and the like. With respect to the orthogonal frequency division multiplex system, the limited bandwidth may be divided into a plurality of sub-channels and data signals will be transmitted in parallel by using a plurality of sub-carriers, and in order to avoid the interference among sub-carriers, each sub-carrier maintains orthogonality with the other sub-carriers. And each sub-carrier can convey a different modulation signal such that each sub-carrier has a different data bit.

When a signal is actually transmitted in a channel, in particular, in a broadband channel, because of the noise which is not flat in the frequency domain, in the communication system with multiple sub-carriers, there will be a different noise interference in each sub-carrier, that is, the quality of transmission environment of each sub-channel is different from each other.

With respect to the orthogonal frequency division multiplex system, to improve the spectral-efficiency and obtain more accurate data transmission, a transmitter will determine the bit-loading in every sub-carrier according to the quality of the channel of the sub-carrier. For example, during the actual transmission, the bit-loading in every sub-carrier will be determined based on the signal-to-noise ratio in the channel of the sub-carrier to improve the spectral-efficiency. Thus, with respect to the communication system with multiple carriers, estimation of noise in every sub-carrier is used to adjust the algorithm parameters and estimate the signal-to-noise ratio and the like, and it is an important factor which affects the spectral-efficiency to estimate noise in every sub-carrier.

The techniques for estimating channel noise have been disclosed in the U.S. Patent Publication No. 6456653, 20040218519 and 20060093074. However, the above patents estimate noise of whole channel by using a sub-carrier in a guard band, an inactive sub-carrier or a sub-carrier without conveying data.

However, with respect to the all well-known techniques for estimating noise and the above patents, it is assumed that the noise power is flat on the whole band, that is, it is assumed that noise in all sub-carriers is same and noise in every sub-carrier is not be estimated. Thus, the quality of the transmission environment in every sub-carrier may not be accurately estimated based on the conventional techniques used for estimating noise to properly adjust bit-loading in every sub-carrier, so that the spectrum will not achieve the optimum efficiency. And, when roughly estimating noise in every sub-carrier, the receiver may adjust worse algorithm parameters or estimate inaccurate signal-to-noise ratio and the like. Thus, the detection error of the data packet or the problem on signal synchronization will be generated so as to generate more and more bit transmission errors. Furthermore, in fact, noise configuration is also not fixed. Taking the transmission channel of AC power line communication network as an example, the distribution of noise power in spectrum will have a periodic variation based on the varying period of AC signal. However, the well-known apparatuses for estimating noise power are being only applied to estimate the constant noise power.

SUMMARY OF THE INVENTION

Accordingly, the present invention is directed to an apparatus for estimating noise power in frequency domain to estimate noise in every sub-carrier to improve the spectral-efficiency.

The present invention is also directed to a method for estimating noise power in frequency domain. The method is applied to a state where no packet is transmitted over the channels. And the method estimates noise in every sub-carrier to accurately adjust the parameter of the transceiver. With respect to the time intervals with different noise configurations, the noise power which is provided for every sub-channel in each noise configuration may be effectively estimated so as to improve the spectrum at various time points and accurately adjust the parameters in the transceiver.

The present invention provides an apparatus for estimating noise power in frequency domain to receive a signal from a transmission channel which includes M sub-channels. The apparatus comprises a state decision device for judging whether no packet is being transmitted over the M sub-channels. When it is judged that no packet is being transmitted over the $K^{th}$ sub-channel, a noise estimation apparatus is enabled. The noise estimation apparatus comprises a frequency domain signal accessing unit, an average unit and a noise power register apparatus, wherein the frequency domain signal accessing unit is applied to access the power of signal over the $K^{th}$ sub-channel, wherein the power is denoted by $P_k$. The average unit fetches $P_k$, and performs an average operation for the $P_k$ and the former estimated average noise power over the $K^{th}$ sub-channel to output the current estimated average noise power over the $K^{th}$ sub-channel, wherein the power is denoted by $N_k$. And the noise power register apparatus comprises M registers, and inputs the fetched $N_k$ in the $K^{th}$ register.

In the light of the operation complexity and storage hardware cost, the present invention provides an apparatus for estimating noise power in frequency domain. The apparatus may perform a value transformation for the $N_k$ by a value processing unit to output or store another formal value of the average noise power over the $K^{th}$ sub-channel, such as logarithm value of the average noise power over the $K^{th}$ sub-channel.

The present invention provides a method for estimating noise power in frequency domain to receive signal from M sub-channels. And when no packet is transmitted over the channels, the power $P_k$ of signal over the $K^{th}$ sub-channel is estimated. And an average operation is performed on the $P_k$ and the former average noise power over the $K^{th}$ sub-channel to output the average noise power $N_k$ of signal over the $K^{th}$ sub-channel.

Based on the method for estimating noise power in frequency domain as described in the exemplary embodiment of the present invention, noise in the channels may be divided into a plurality of noise configurations according to time, and when no packet is transmitted over the channels, the noise power of every sub-channel in different noise configurations is estimated, and the estimated results are stored in storage blocks respectively or outputted to back end circuits to improve spectral-efficiency and adjust the parameters of the transceiver in different noise configuration intervals.

The present invention is applied to a state where no packet is transmitted over the channels to estimate noise in every sub-carrier. Furthermore, in the present invention, every time point may correspond to a noise configuration, and in every noise configuration, the noise power in every sub-channel will be estimated, respectively. Thus, the present invention may accurately acquire the transmission status of every sub-channel.

These and other exemplary embodiments, features, aspects, and advantages of the present invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Now, with respect to the well-known techniques for estimating noise in frequency domain, the noise in a portion of sub-carriers is only roughly estimated, and it is assumed that the noises in all sub-carriers are same. However, when a signal is actually transmitted in the channels, in particular, in a broadband communication system, noise is usually not flat in different frequency domains, such that there will be different noise interference in each sub-carrier. Thus, in the embodiment of the present invention, an apparatus and a method for estimating noise power are provided to estimate noise in every sub-carrier to accurately acquire the quality of the transmission environment of each sub-channel.

Figure 1:
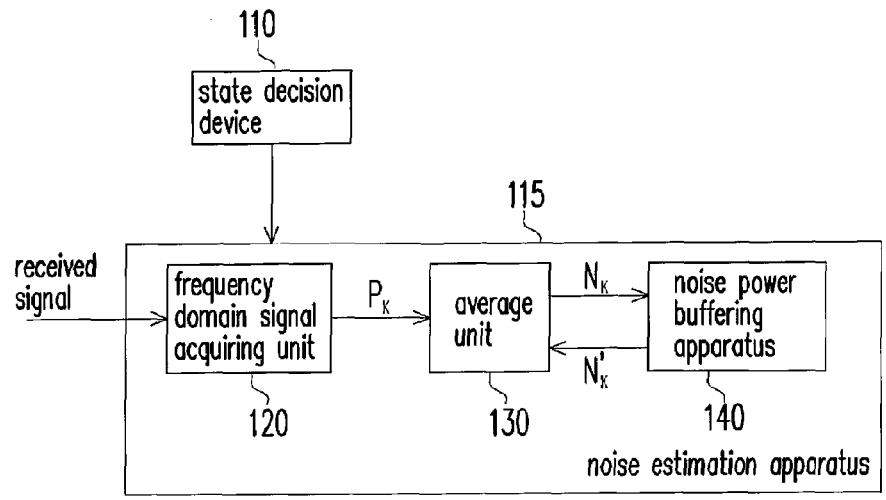
FIG. 1 is a block diagram illustrating an apparatus for estimating noise power in frequency domain according to an exemplary embodiment of the present invention.

FIG. 1 is a block diagram illustrating an apparatus for estimating noise power in frequency domain according to an exemplary embodiment of the present invention. The apparatus may be applied to a communication system, such as an orthogonal frequency division multiplex system, a frequency division multiplexing system and other communication system with multiple carriers. For the purpose of illustrating the present invention, the apparatus for estimating noise power in frequency domain is applied to an orthogonal frequency division multiplex system, and the application will not limit the scope of the present invention.

Referring to FIG. 1, the apparatus for estimating noise power in frequency domain comprises a state decision device 110 and noise estimation apparatus 115, wherein the noise estimation apparatus 115 comprises a frequency domain signal accessing unit 120, an average unit 130 and an noise power register apparatus 140.

The state decision device 110 will judge whether a packet is transmitted over the channels. When no packet is transmitted over the channels (i.e., a state where no packet is transmitted over the channels), the state decision device 110 will output a enabling signal to the noise estimation apparatus 115 to enable the noise estimation apparatus 115 to start detecting signal in the channels. In the embodiment, the state decision device 110 comprises, for example, a packet detector in a transceiver of the orthogonal frequency division multiplex system in which a packet is a signal transmission mode to judge whether a packet is transmitted over the channels.

The noise estimation apparatus 115 receives a signal transmitted over the channels, and the received signal comprises, for example, M sub-carriers, and the channel may be in correspondence viewed as M sub-channels. And, because no packet is being transmitted at the time, the received signal is the noise in the channels. The frequency domain signal accessing unit 120 will access the signal over the $K^{th}$ sub-channel and calculate its power, denoted by $P_k$, wherein the K is in a range of 1 to M.

In the embodiment, the noise estimation apparatus 115 is, for example, a fast Fourier transform processor, and after a fast Fourier transformation is performed on the received signal, the component in every sub-carrier frequency of the received signal is acquired. For example, the component in frequency of the $K^{th}$ sub-carrier may be denoted by $Y_k$, and the power $P_k$ of signal in the $K^{th}$ sub-channel is $|Y_k|^2$.

The average unit 130 receives the power $P_k$ of signal in the $K^{th}$ sub-channel and read the former calculated average noise power in the $K^{th}$ sub-channel which is denoted by $N_k'$, and an average operation is performed on the $P_k$ and the $N_k'$ to output the average noise power $N_k$ in the $K^{th}$ sub-channel. In the embodiment, the average operation comprises, for example, a moving average operation or an autoregressive operation and the like.

The noise power register apparatus 140 comprises M registers to store the average noise power in the M sub-channels, respectively. And the noise power register apparatus 140 is coupled to the average unit 130. When the noise power register apparatus 140 receives the average noise power $N_k$ in the $K^{th}$ sub-channel from the average unit 130, the $N_k$ will be stored in the $K^{th}$ register, wherein the K is in a range of 1 to M.

In the above-said embodiment, for example, the frequency domain signal accessing unit 120 may output sequentially the power of signal in every sub-channel. And an average operation will be sequentially performed on the power of signal in every sub-channel by the average unit 130 and the average noise power will be sequentially stored in the registers of the noise power register apparatus 140 based on the K value (i.e., the average noise power belonging to the sub-channel). However, those of ordinary skill in the art would understand that the frequency domain signal accessing unit 120 may also simultaneously output the power of signal in a plurality of sub-channels, and the average unit 130 may also simultaneously perform an average operation for the power of signal in a plurality of sub-channels, and may simultaneously store a plurality of average noise power in the noise power register apparatus 140.

Furthermore, the state decision device 110 in FIG. 1 may also respectively judge whether a packet is transmitted over the M sub-channels. When no packet (signal) is transmitted over the $K^{th}$ sub-channel, the noise estimation apparatus 115 will be enabled and be informed to access the power of signal in the $K^{th}$ sub-channel. Thus, the frequency domain signal accessing unit 120 in the noise estimation apparatus 115 will only access the power $P_k$ of signal in the $K^{th}$ sub-channel, and after a average operation is performed, the power $P_k$ will be stored in the corresponding position of registers of the noise power register apparatus 140 based on the K value.

It is noted that the embodiment has illustrated a possible configuration for the apparatus for estimating noise power in frequency domain, however, those of ordinary skill in the art would understand that the designs of the apparatus for estimating noise power in frequency domain of various manufacturers are all different, thus the application of the present invention shall not be limited to this particular configuration. That is to say that any apparatus and method that estimate noise in the sub-channels by using a state where no packet is transmitted over the channels are within the spirit and scope of the present invention.

Next, another more detailed embodiment of the present invention will be provided to enable those of ordinary skill in the art to easily implement the present invention.

Figure 2:
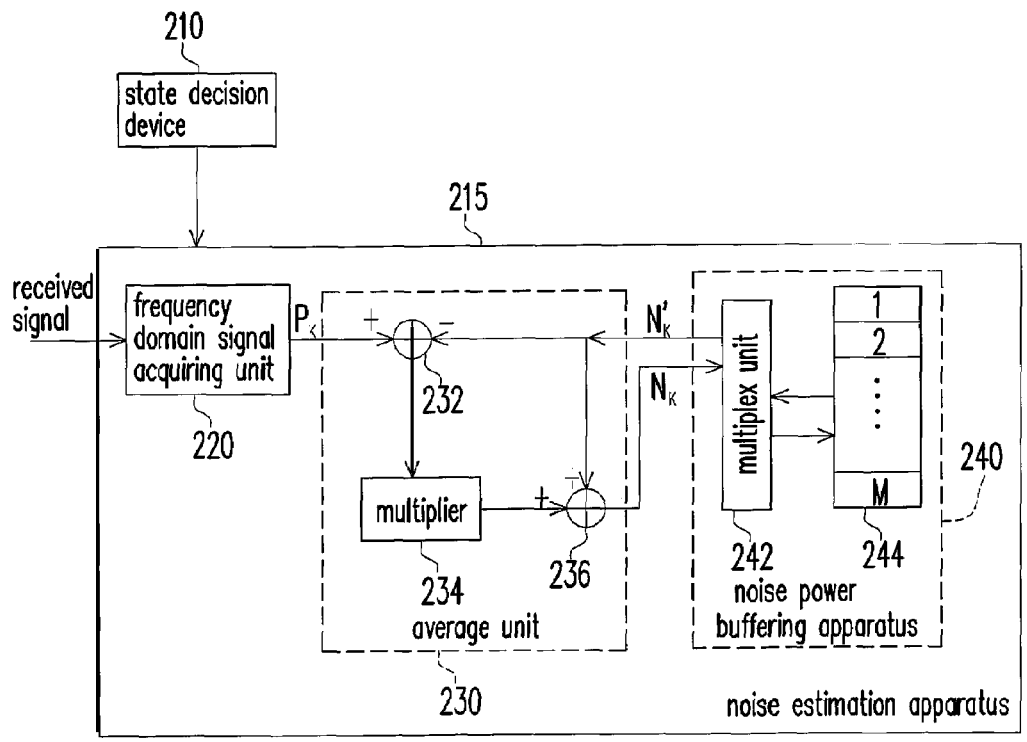
FIG. 2 is a block diagram illustrating an apparatus for estimating noise power in frequency domain according to another exemplary embodiment of the present invention.

FIG. 2 is a block diagram illustrating an apparatus for estimating noise power in frequency domain according to another exemplary embodiment of the present invention. The apparatus may be applied to a communication system, such as an orthogonal frequency division multiplex system, a frequency division multiplexing system and other communication system with multiple carriers. For the purpose of illustrating the present invention, the apparatus for estimating noise power in frequency domain is applied to an orthogonal frequency division multiplex system, and the application will not limit the scope of the present invention.

Referring to FIG. 2, the apparatus for estimating noise power in frequency domain comprises a state decision device 210 and a noise estimation apparatus 215, wherein the noise estimation apparatus 215 comprises a frequency domain signal accessing unit 220, an average unit 230 and an noise power register apparatus 240.

The state decision device 210 in FIG. 2 is the same as the state decision device 110 in FIG. 1, and the frequency domain signal accessing unit 220 in FIG. 2 is the same as the frequency domain signal accessing unit 120 in FIG. 1, and therefore detail description thereof will not to repeated.

The average unit 230 in FIG. 2 receives the power $P_k$ of signal in the $K^{th}$ sub-channel from the noise estimation apparatus 215 and read the former calculated average noise power $N_k'$ in the $K^{th}$ sub-channel, and an autoregressive operation is performed on the $P_k$ and the $N_k'$ to output the average noise power $N_k$ in the $K^{th}$ sub-channel, wherein the mathematical formula of the autoregressive operation is:

$$N_k = (1-\alpha) \times N_k' + \alpha P_k = (P_k - N_k') \times \alpha + N_k',$$

wherein the $\alpha$ is an adjustable regressive parameter.

In the embodiment, the average unit 230 may perform an autoregressive operation by using a first adder 232, a multiplier 234 and a second adder 236. And the first adder 232 in the average unit 230 is coupled to the noise power register apparatus 240, the frequency domain signal accessing unit 220 and the multiplier 234 to receive the power $P_k$ of signal in $K^{th}$ sub-channel and the former average noise power $N_k'$ in the $K^{th}$ sub-channel, and the $P_k$ will be subtracted by the $N_k'$ to output the differential value between the $P_k$ and the $N_k'$ to the multiplier 234.

The multiplier 234 in the average unit 230 is coupled to the first adder 232 and the second adder 236, and will multiply the differential value between the $P_k$ and the $N_k'$ by the regressive parameter $\alpha$, and then the multiplication result will be outputted to the second adder 236. However, those of ordinary skill in the art would understand that if the regressive parameter $\alpha$ is the power of 2, for example, the multiplier 234 may be applied by using a shifter.

The second adder 236 in the average unit 230 is coupled to the noise power register apparatus 240 and the multiplier 234 to add the output value of the multiplier 234 to the $N_k'$, and output the addition result to update the $N_k$ value stored in the noise power register apparatus 240.

The noise power register apparatus 240 in FIG. 2 comprises a multiplex unit 242 and M registers, wherein M registers 244 respectively store average noise power in the M sub-channels. And the multiplex unit 242 is coupled to the second adder 236, the first adder 242 and the registers 244, and updates the average noise power $N_k$ stored in the $K^{th}$ register based on the K value, and outputs the $N_k$ value stored in the $K^{th}$ register (i.e., the above-said former average noise power $N_k'$ in the $K^{th}$ sub-channel) to the second adder 236 and the first adder 232.

It can be seen from the above-said embodiment that the average noise power in the noise power register apparatus will be continuously updated to let the transceiver acquire noise in every sub-carrier and the quality of the transmission environment of every sub-channel. Thus, the transceiver may updatingly adjust algorithm parameters or signal-to-noise ratio and the like, and may properly adjust bit-loading in every sub-carrier to improve the spectral-efficiency and to decrease the error probability in transmission.

However, in actual transmission environment, the property of noise will always vary based on time. Thus, at different time points, the distribution of noise in frequency will also vary. Even with respect to some channels with specific forms (for example, the transmission channel of AC power line communication network), the distribution configuration in frequency of noise power will periodically vary.

Figure 3:
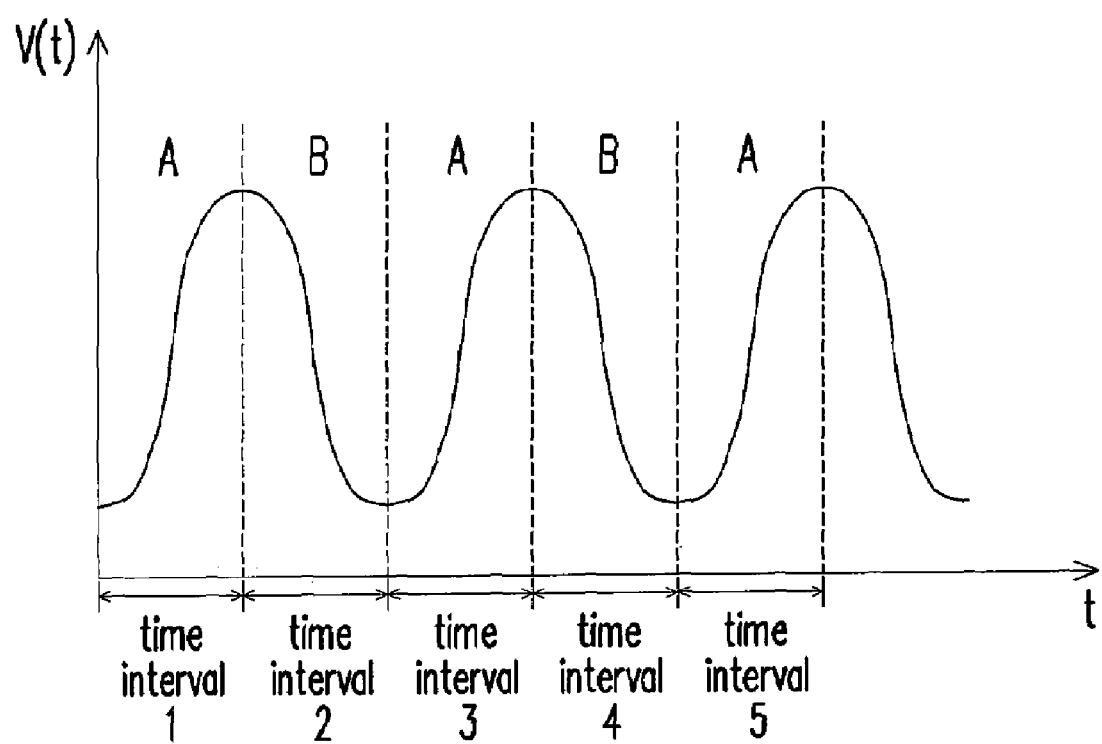
FIG. 3 is a schematic view illustrating a string wave of AC power over the transmission channels of AC power line communication network.

For example, with respect to the transmission channel of AC power line communication network, as shown in FIG. 3, the AC power having a frequency in a range of 50 Hz to 60 Hz is transmitted over AC power line, and the AC power may be a string wave as shown in FIG. 3. Thus, in the transmission channels of AC power line communication network, the variation of the string wave will result in the variation of the distribution in frequency of noise. And AC power is a periodic string wave, so that the distribution in frequency of noise will periodically appear.

If noise in the transmission channels of AC power line communication network has two different configurations, the time axis in FIG. 3 may be divided into a plurality of time intervals by using different noise configurations. For example, like the distribution in spectrum of noise, the different time points in time interval 1 may also correspond to a noise configuration A, and like the distribution in spectrum of noise, the different time points in time interval 2 may also correspond to a noise configuration B, and the different time points in the next time intervals may also correspond to the noise configuration A or B.

Next, in order to easily apply the invention by those of ordinary skill in the art, another apparatus for estimating noise power in frequency will be described, and it is assumed that the transmission channel is the transmission channel of AC power line communication network. However, this type of channel configuration is not intended to limit the scope of the present invention.

Figure 4:
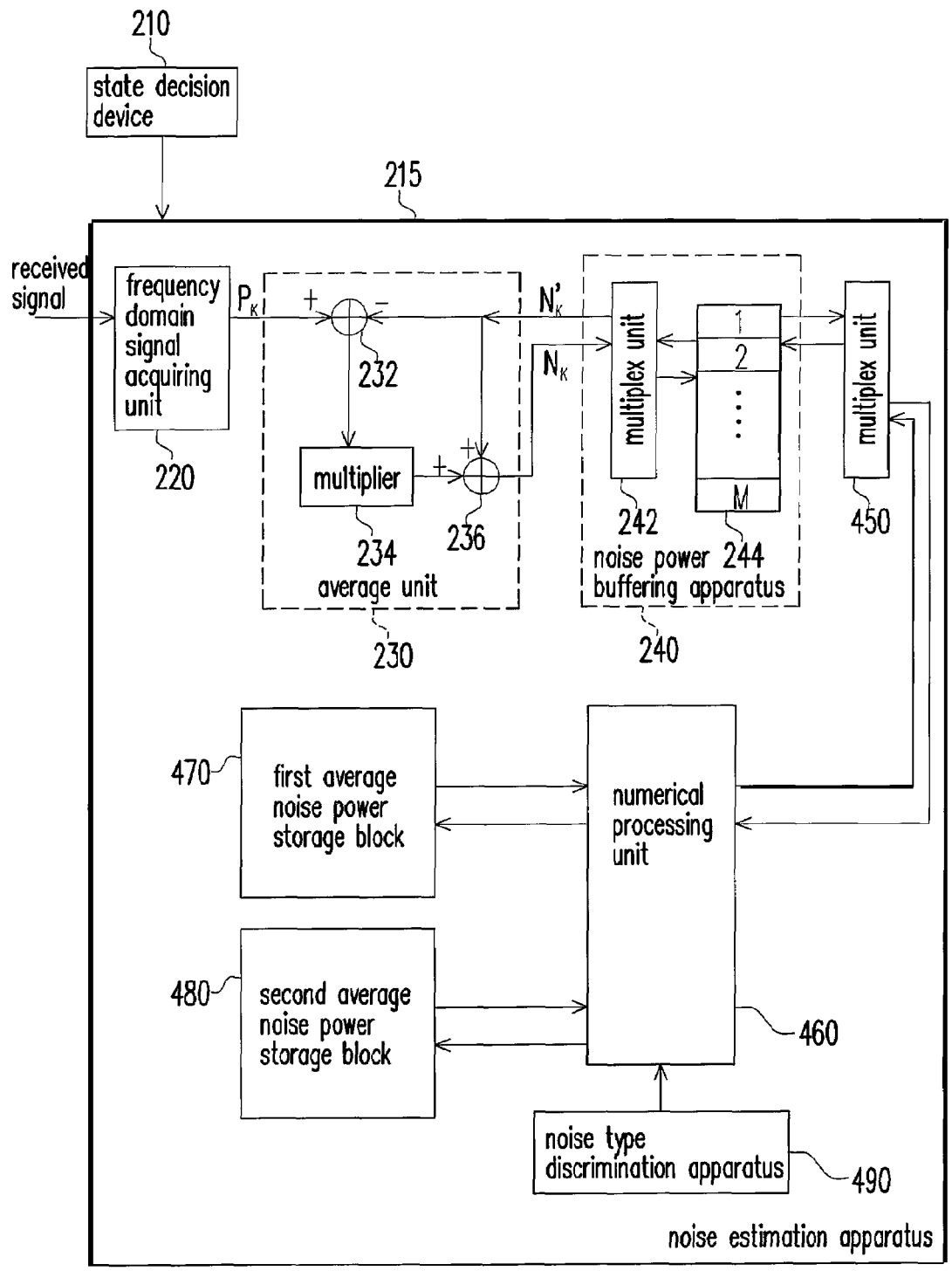
FIG. 4 is a block diagram illustrating an apparatus for estimating noise power in frequency domain according to another exemplary embodiment of the present invention.

FIG. 4 is a block diagram illustrating the apparatus for estimating noise power in frequency domain according to another exemplary embodiment of the present invention. The apparatus may be applied to a communication system, such as an orthogonal frequency division multiplex system, a frequency division multiplexing system and other communication system with multiple carriers. For illustrating the present invention, the apparatus for estimating noise power in frequency domain is applied to an orthogonal frequency division multiplex system, and the application is not intended to limit the scope of the present invention.

Referring to FIG. 4, the apparatus for estimating noise power in frequency domain comprises a state decision device 210 and a noise estimation apparatus 215, wherein the noise estimation apparatus 215 comprises a frequency domain signal accessing unit 220, an average unit 230, an noise power register apparatus 240, a multiplex unit 450, a value processing unit 460, a first average noise power storage block 470, a second average noise power storage block 480 and a noise configuration discrimination apparatus 490.

The state decision device 210, the frequency domain signal accessing unit 220, the average unit 230 and the noise power register apparatus 240 in FIG. 4 correspond to elements described in the embodiment with reference to FIG. 2, and therefore, detailed description thereof will not repeated.

The multiplex unit 450 in FIG. 4 is coupled to the noise power register apparatus 240, and outputs the $N_k$ value stored in the $K^{th}$ register in the noise power register apparatus 240 to the value processing unit 460 based on the K value.

In the embodiment, for example, the received signal in FIG. 4 will be processed by the former circuit, and the original signal received by the receiver will be adjusted using a gain controller value agc_gain via an auto gain controller (not shown), and then be outputted to the frequency domain signal accessing unit 220. Thus, in order to acquire the original noise which is not adjusted by an auto gain controller, the value processing unit 460 will divide the value $N_k$ by the gain controlling value agc_gain to obtain the real noise power in the channels. After the value $N_k$ is divided by the gain controlling value agc_gain, the value processing unit 460 will perform a logarithm transformation operation and will output the logarithm value $L_k$ of the average noise power to decrease the required bits for storing the average noise power.

In the embodiment, the transmission channel is, for example, the transmission channel of AC power line communication network, and the distribution in frequency of noise in the transmission channel of AC power line communication network will periodically appear. Thus, in the embodiment, the received signal may be divided into a plurality of time intervals in time domain based on noise configuration, and every time interval may correspond to a noise configuration. For the purpose of illustrating the present invention, it is assumed that the noise has only two different noise configurations, denoted respectively by the noise configurations A and B. And it is assumed that the corresponding time intervals and the noise configurations are, for example, as shown in FIG. 3. That is, the noise over the channels in the time intervals 1, 3 and 5 has the same spectrum distribution, and the noise over the channels in the time intervals 2 and 4 has the same spectrum distribution, and the spectrum distribution of the noise over the channels in the time intervals 1, 3 and 5 is different from that of the noise over the channels in the time intervals 2 and 4. However, for the purpose of illustrating the present invention, in the embodiment, it is assumed that the noise in the channels has only two different noise configurations, and this assumption may not limit the scope of the present invention. Those of ordinary skill in the art would understand that in actual transmission, noise configurations in the channels and division of time intervals are classified based on the actual transmission status in the channels.

Thus, the noise configuration discrimination apparatus 490 in the embodiment would divide the received signal into a plurality of time intervals in time domain by using the property of periodic distribution in frequency of noise in the channels, and will find the noise configuration corresponding to every time interval. And, the noise configuration discrimination apparatus 490 is coupled to the value processing unit 460 providing the correspondence between every time interval and noise configuration, such that the value processing unit 460 may know the noise configuration corresponding to the current received signal.

In order to respectively store noise power of different noise configurations, in the embodiment in FIG. 4, two average noise power storage blocks 470 and 480 are provided to respectively correspond to the noise configurations A and B. And the first average noise power storage block 470 and the second average noise power 480 are coupled to the value processing unit 460, and respectively comprise M storage units. And every storage unit is applied to store average noise power in the sub-channels.

Thus, when the noise configuration discrimination apparatus 490 judges that the received signal is in the time interval A, the value processing unit 460 will output the logarithm value $L_k$ of the average noise power to the $K^{th}$ storage unit in the first average noise power storage block 470 based on the K value.

When the noise configuration discrimination apparatus 490 judges that the received signal is in the time interval B, the value processing unit 460 will output the logarithm value $L_k$ of the average noise power to the $K^{th}$ storage unit in the second average noise power storage block 480 based on the K value.

In the embodiment, when the average noise power $N_k$ stored in a register 244 of the noise power storage apparatus 240 is updated, the multiplex unit 450 will output the updated average noise power $N_k$ to the value processing unit 460, such that after the average noise power $N_k$ is processed by the value processing unit 460, the $N_k$ will be stored in the first average noise power storage block 470 or the second average noise power storage block 480.

Or, when the average noise power stored in all registers of the noise power storage apparatus 240 is all updated (i.e., the average noise power on all sub-carriers in the whole orthogonal frequency division multiplex symbol is updated), the multiplex unit 450 will sequentially or simultaneously output every updated average noise power to the value processing unit 460, and the value processing unit 460 will also sequentially or simultaneously process every updated average noise power. And, at the time when the average noise power is the average noise power on every sub-carrier in the same symbol, average noise power which is processed by the value processing unit 460 is the noise in the same time interval, and the value processing unit 460 may sequentially or simultaneously input every processed average noise power in the first average noise power storage block 470 or the second average noise power storage block 480.

Furthermore, when the noise configuration discrimination apparatus 490 judges that the received signal is changed from the time interval A to the time interval B, the value processing unit 460 will perform an exponential transformation operation on the logarithm values $L_k$ of all the average noise power after the value processing unit 460 reads the logarithm values $L_k$ of the average noise power in all the storage units of the second average noise power storage block 480, and then the operation result will be multiplied by the former gain controlling value agc_gain stored in the interval B to restore the former estimated average noise power of the noise configuration. And all the average noise power will be input in the registers 244 in the noise power register apparatus 240 based on the K value by the multiplex 450, that is, all the average noise power in the registers 244 will be converted to the average noise power in all sub-channels where the noise configuration B appears last time. And the currently received signal is in the noise configuration B, thus the average unit 230 will read the average noise power in the registers 244 as the starting value for an autoregressive operation.

Conversely, furthermore, when the noise configuration discrimination apparatus 490 judges that the received signal is changed from the time interval B to the time interval A, the value processing unit 460 will perform an exponential transformation operation for all the logarithm values $L_k$ of the average noise power after the value processing unit 460 reads the logarithm values $L_k$ of the average noise power in all the storage units of the first average noise power storage block 470, and then the operation result will be multiplied by the gain controlling value agc_gain formerly stored in the interval A to restore the formerly estimated average noise power of the noise configuration. And all the average noise power will be input in the registers 244 in the noise power register apparatus 240 based on the K value by the multiplex 450.

Next, according to the block diagram illustrating an apparatus for estimating noise power in frequency domain as shown in FIG. 4, a method for estimating noise power in frequency domain is provided to apply the present invention which is described in detail as follows.

Figure 5:
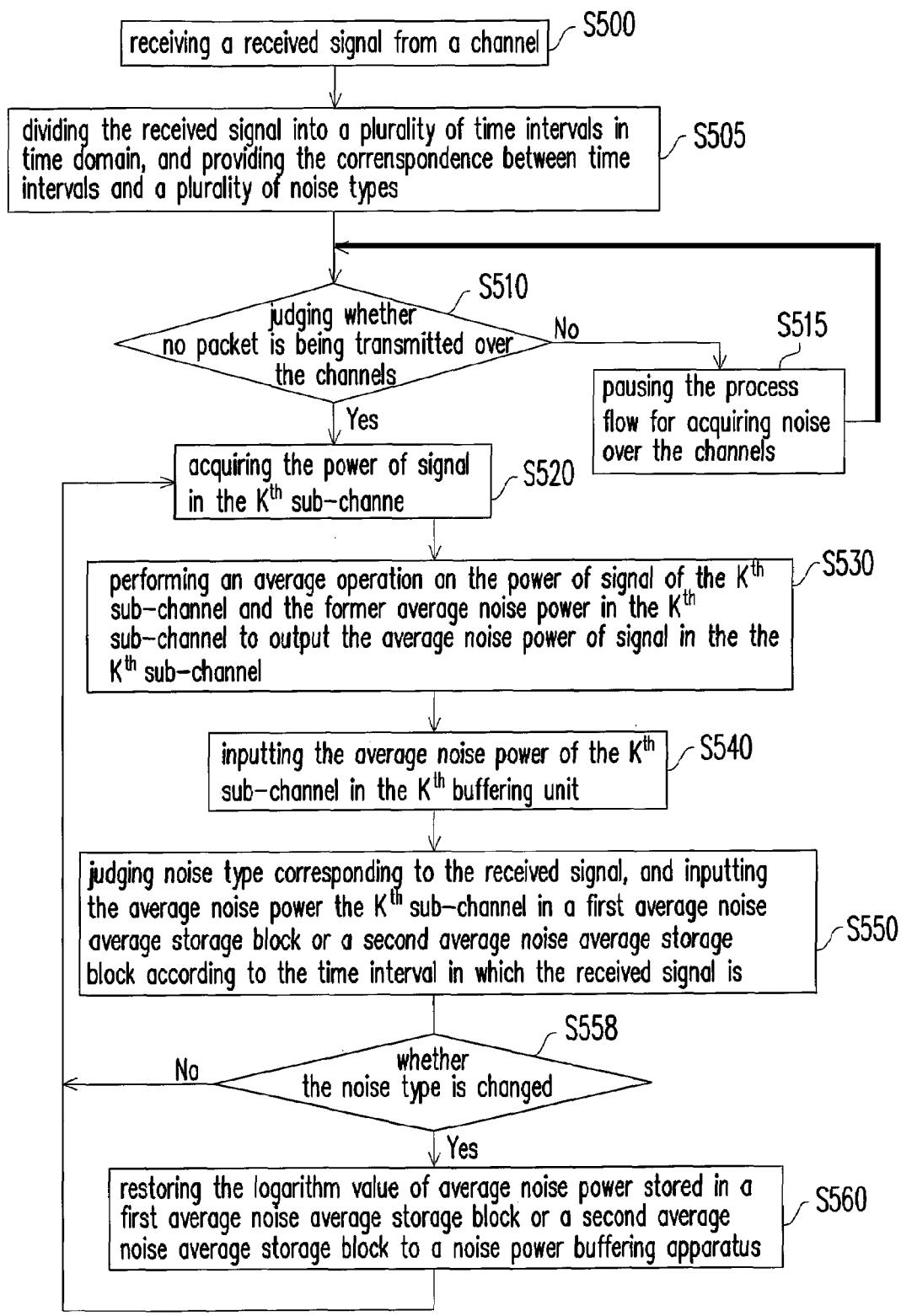
FIG. 5 is a flowchart illustrating a method for estimating noise power in frequency domain according to an exemplary embodiment of the present invention.

FIG. 5 is a flowchart illustrating the steps of the method for estimating noise power in frequency domain according to the exemplary embodiment of the present invention. The method may be applied to a communication system with multiple carriers, such as an orthogonal frequency division multiplex system, a frequency division multiplexing system and other communication system with multiple carriers. For illustrating the present invention, the method is applied to an orthogonal frequency division multiplex system, and it is assumed that the transmission channel is the transmission channel of AC line communication network, and the application is not intended to limit the scope of the present invention.

Referring to FIG. 4 and FIG. 5, first, the signal from the channels (step S500) is received, and the received signal comprises, for example, M sub-carriers, and the channel is correspondingly divided into M sub-channels.

Next, the noise configuration discrimination apparatus 490 will divide the received signal into a plurality of time intervals in time domain, and the correspondence between the time intervals and the noise configurations will be found (step S505). If the channel has only two different noise configurations on time, each time interval will correspond to the noise configuration A or the noise configuration B.

Next, the state decision device 210 judges whether no packet is transmitted over the channels (step S510). When a packet is being transmitted over the channels, the process flow for accessing the noise in the channels will be paused (step S515), and process flow returns to the step S510 until a state where no packet is transmitted in channels.

Conversely, the state decision device 210 judges that no packet is being transmitted over the channels, the power of signal over the $K^{th}$ sub-channel will be sequentially accessed by the frequency domain signal accessing unit 220 (step S520), because at this time no packet is being transmitted over the channels, the received signal is noise, and the power of signal over the $K^{th}$ sub-channel is also the power of noise over the $K^{th}$ sub-channel. In the embodiment, the received signal is, for example, an orthogonal frequency division multiplex symbol (OFDM symbol), the symbol is formed of multiple sub-carriers, and the step S520 may access signal in every sub-carrier in the symbol by using a fast Fourier transformation.

Next, an average operation is performed on the power $P_k$ of signal in the $K^{th}$ sub-channel and the former average noise power $N_k'$ in the $K^{th}$ sub-channel to output the average noise power $N_k$ in the $K^{th}$ sub-channel (step S530).

Figure 6:
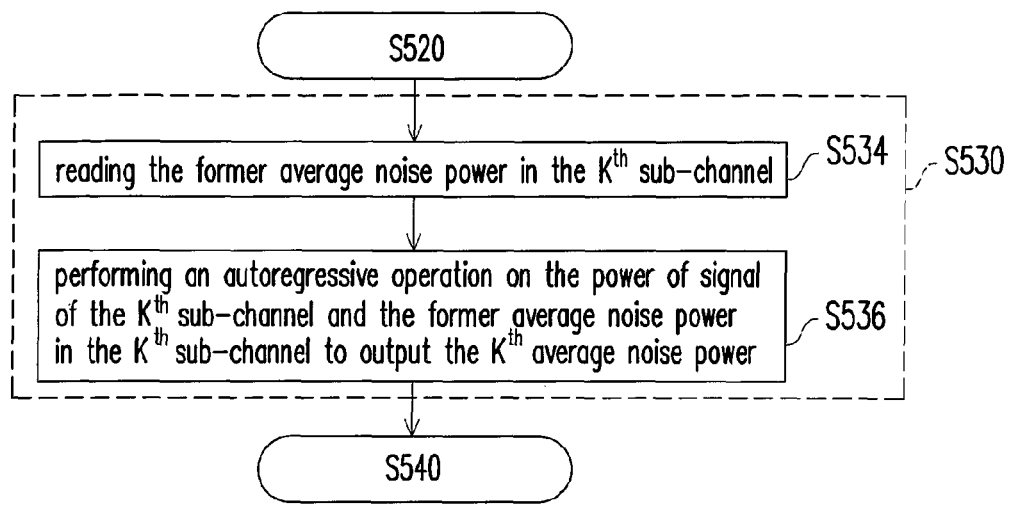
FIG. 6 is a flowchart illustrating the sub-step of the step S530.

In the step S530, the average operation comprises, for example, a moving average operation or an autoregressive operation and the like. Taking an autoregressive operation as an example, the above-said step S530 comprises, for example, the following sub-steps as shown in FIG. 6. Referring to FIG. 4 and FIG. 6, first, the former average noise power $N_k'$ in the $K^{th}$ sub-channel of the $K^{th}$ register 244 in the noise power storage apparatus 240 is read (step S534).

Next, an autoregressive operation is performed on the power $P_k$ of signal over the $K^{th}$ sub-channel and the former average noise power $N_k'$ in the $K^{th}$ sub-channel to output the average noise power $N_k$ in the $K^{th}$ sub-channel (step S536), wherein the mathematical formula in the autoregressive operation is:

$$N_k=(1-\alpha)\times N_k'+\alpha P_k,$$

wherein the $\alpha$ is a regressive parameter.

As it can be seen from the steps S534 and S536 that the more the number of repeating the steps S534 and S536, the more the average noise power over the sub-channels of the noise power register apparatus will approach to the actual average power of noise in the channels.

Referring to FIG. 4 and FIG. 5 again, after an average operation is performed, the average noise power $N_k$ in the $K^{th}$ sub-channel will be input in the $K^{th}$ register 244 (step S540) to update the average noise power $N_k$ over the $K^{th}$ sub-channel stored in the $K^{th}$ register 244.

Next, the noise configuration corresponding to the received signal is determined based on the time interval in which the received signal is, and the average noise power $N_k$ over the $K^{th}$ sub-channel is input in the first average noise power storage block 470 or the second average noise power storage block 480 (step S550).

Figure 7:
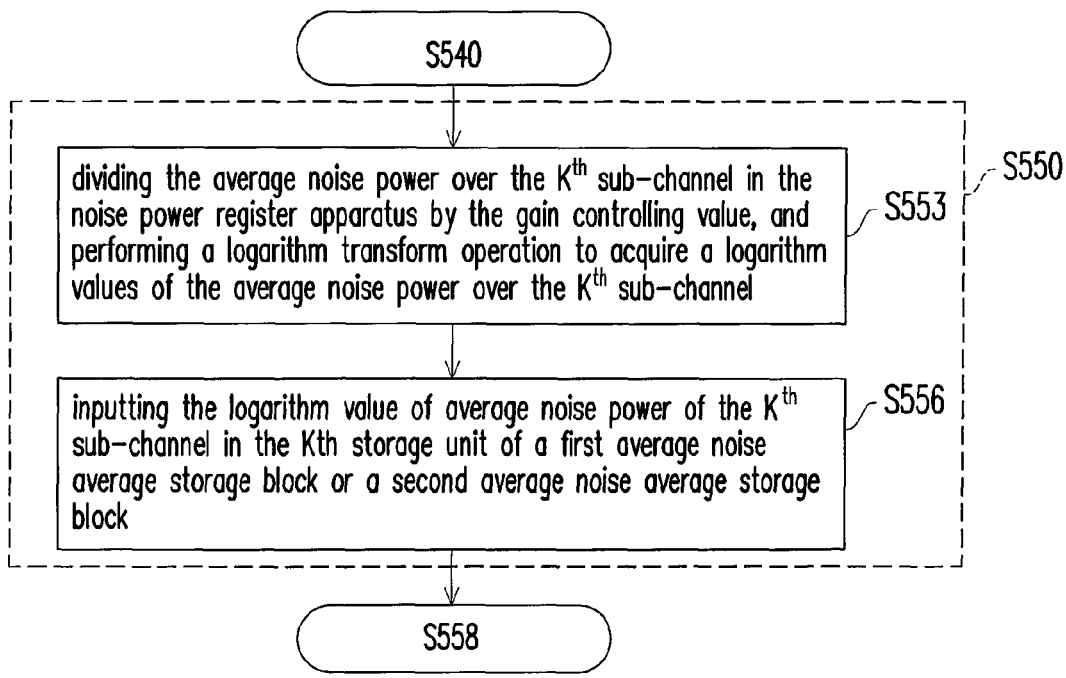
FIG. 7 is a flowchart illustrating the sub-step of the step S550.

In the embodiment, step S550 comprises, for example, the following sub-steps as shown in FIG. 7. Referring to FIG. 4 and FIG. 7, the average noise power $N_k$ over the $K^{th}$ sub-channel in the noise power register apparatus 240 is sequentially divided by the gain controlling value agc_gain applied to the symbol, and then a logarithm transformation operation is performed to acquire a logarithm values $L_k$ of the average noise power over the $K^{th}$ sub-channel (step S553).

Next, based on the noise configuration corresponding to the time interval in which the received signal is, the logarithm values $L_k$ of the average noise power over the $K^{th}$ sub-channel is sequentially input in the $K^{th}$ storage unit the first average noise power storage block 470 or the second average noise power storage block 480 (step S556).

In the embodiment, the received signal is, for example, an orthogonal frequency division multiplex symbol, so that step S550 is performed after the signal of all sub-carriers in the symbol which an average operation has been performed on is input in the noise power register apparatus 240, that is the step S550 is performed after the average noise power value over every sub-channel in the M registers 244 is updated. For example, the step S550 is also directly performed once the average noise power in a register 244 is updated.

Referring to FIG. 4 and FIG. 5, the average unit 230 may have a starting value when the average unit 230 will perform an autoregressive operation after the noise configuration is changed. And after the average noise power has been stored in the average noise power storage blocks 470 or 480, the noise configuration discrimination apparatus 490 will judge whether the noise configuration is changed (step S558). If the current noise configuration is not changed, the process flow will return to the step S520 to continue to access noise over the channels.

Conversely, if it is judged that the noise configuration of the time interval of the received signal is changed, that is, the noise configuration is changed from the noise configuration A to the noise configuration B or from the noise configuration B to the noise configuration A, the logarithm value $L_k$ of the average noise power stored in the first average noise power storage block 470 or the second average noise power storage block 480 will be restored, and will be input in the noise power register apparatus 240 (step S560) to let the average unit 230 acquire the starting value for an autoregressive operation.

Figure 8:
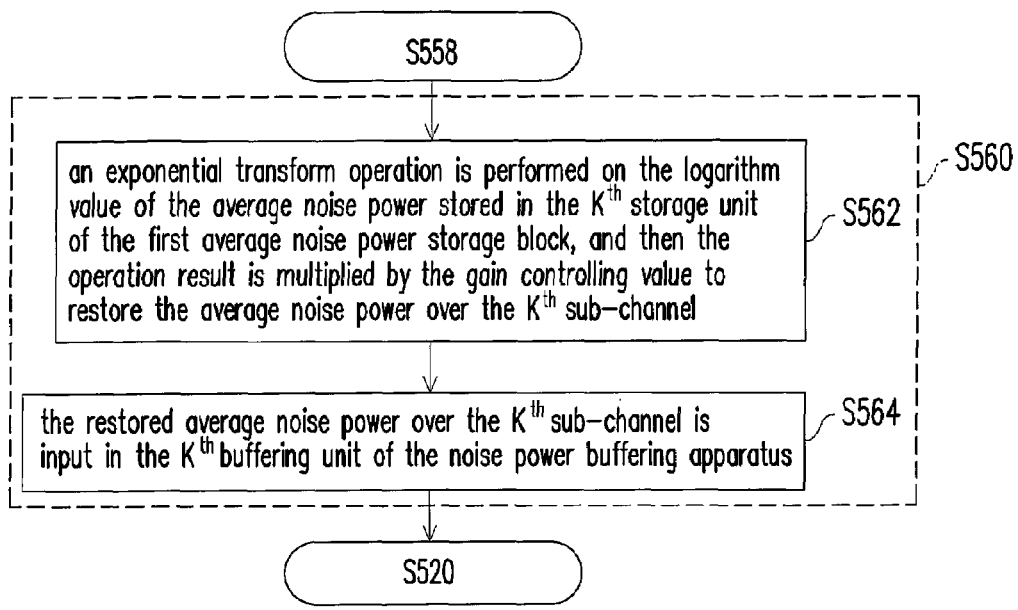
FIG. 8 is a flowchart illustrating the sub-step of the step S560.

In the embodiment, if the noise configuration of the received signal is transformed from the noise configuration B to the noise configuration A, the step S560 comprises, for example, a plurality of sub-steps as shown in FIG. 8. Referring to FIG. 4 and FIG. 8, an exponential transformation operation will be sequentially performed on the logarithm value $L_k$ of the average noise power stored in the $K^{th}$ storage unit of the first average noise power storage block 470, and then the operation result will be multiplied by the gain controlling value agc_gain which is formerly stored and corresponds to the former time interval to restore the average noise power $N_k$ over the $K^{th}$ sub-channel (step S562).

Next, the restored average noise power $N_k$ in the $K^{th}$ sub-channel will be input in the $K^{th}$ register of the noise power register apparatus 240 (step S564).

Figure 9:
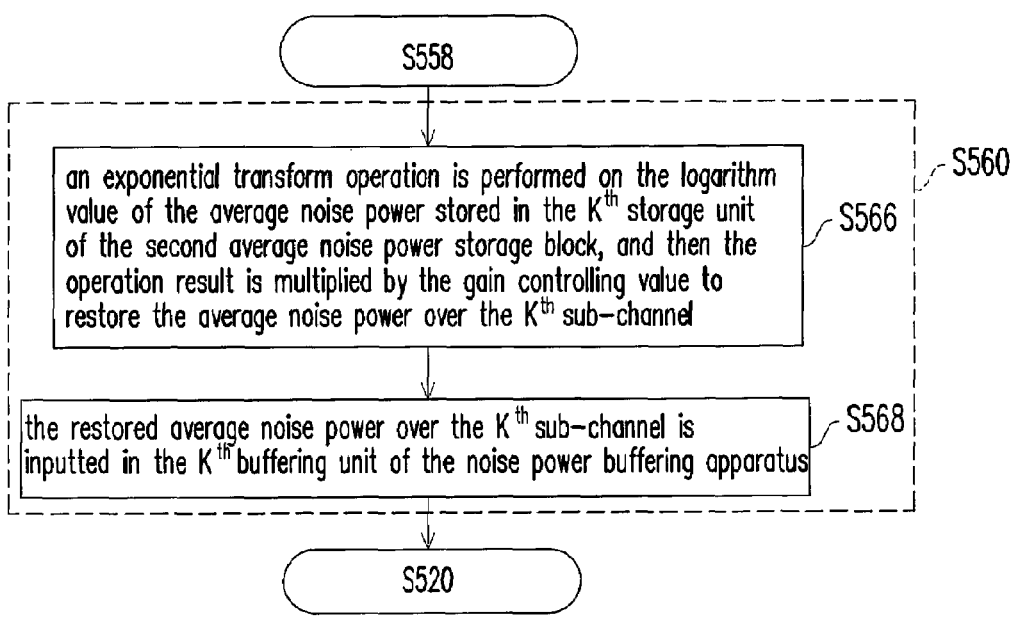
FIG. 9 is a flowchart illustrating the sub-step of the step S560.

In the embodiment, if the noise configuration of the received signal is changed from the noise configuration A to the noise configuration B, the step S560 comprises, for example, a plurality of sub-steps as shown in FIG. 9. Referring to FIG. 4 and FIG. 9, an exponential transform operation will be sequentially performed on the logarithm value of the average noise power stored in the $K^{th}$ storage unit of the second average noise power storage block 480, and then the operation result will be multiplied by the gain controlling value agc_gain which is formerly stored and corresponds to the former time interval to restore the average noise power $N_k$ over the $K^{th}$ sub-channel (step S566).

Next, the restored average noise power $N_k$ over the $K^{th}$ sub-channel will be input in the $K^{th}$ register of the noise power register apparatus 240 (step S568).

Referring to FIG. 4 and FIG. 5, after the reduced average noise power has been input in the noise power register apparatus 240, the process flow will return to the step S520 to continue to access noise in the channel.

In the embodiment, with respect to the steps S520 to S560, it is assumed that the state decision device 210 does not detect that a packet is being transmitted over the channels. However, actually, there is a packet that needs to be transmitted over the channels. Thus, when the state decision device 210 detects a packet is being transmitted over the channels, the process flow for accessing the noise over the channels will be paused, and continue to access noise over channels until no packet is being transmitted over the channels.

In short, by using a state where no packet is being transmitted over the channels, the embodiments estimate noise in every sub-carrier and accurately acquire the transmission status of every sub-channel to allow the transceiver to properly and accurately adjust the accurate algorithm parameters and estimate signal-to-noise ratio and the like. And, after the transmission environment of every sub-channel is acquired, bit-loading in every sub-carrier may be adjusted to fully utilize the transmission frequency band.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for estimating noise power in frequency domain to receive a received signal from a channel comprising M sub-channels, the apparatus comprising:
    a state decision device, for judging a state whether the M sub-channels is in a state where no packet is being transmitted, wherein when a $K^{th}$ sub-channel is in a state where no packet is transmitted, a noise estimation apparatus is enabled; and the noise estimation apparatus comprises:
        a frequency domain signal accessing unit, for accessing a signal in a frequency domain to estimate a power of signal over the $K^{th}$ sub-channel, denoted by $P_k$;
        an average unit, for receiving the $P_k$ and perform an average operation on the Pk and a former average noise power over the $K^{th}$ sub-channel to output an average noise power over the $K^{th}$ sub-channel, denoted by $N_k$; and
        a noise power register apparatus, comprising M registers to receive the $N_k$ and input the $N_k$ in a $K^{th}$ register,
    a first multiplex unit, for outputting a $N_k$ value stored in the $K^{th}$ register of the noise power register apparatus based on a K value;
    a noise power discrimination apparatus, for dividing the channel into a plurality of time intervals in time domain and providing correspondence between time intervals and a plurality of noise configurations;
    a plurality of average noise power storage blocks, corresponding to the noise configurations, wherein each of the average noise power storage blocks comprises M storage units; and
    a value processing unit, coupled to the first multiplex unit, for performing an operation on the $N_k$ to output an logarithm value of average noise power which is denoted and judging a specific noise configuration corresponding to the channel in a predetermined time interval and store the $L_k$ computed by the value processing unit in the $K^{th}$ storage unit of a predetermined average noise power storage block according to a predetermined time interval corresponding to the received signal via the noise power discrimination apparatus, wherein the average noise power storage block corresponds to the specific noise configuration.

2. The apparatus for estimating noise power in frequency domain according to claim 1, wherein the average operation comprises an autoregressive operation.

3. The apparatus for estimating noise power in frequency domain according to claim 1, wherein the former average noise power over the $K^{th}$ sub-channel is denoted by $N_k'$, and the average unit comprises:
  a first adder, coupled to the noise power register apparatus and the frequency domain signal accessing unit, for subtracting the $P_k$ by the $N_k'$ to output a differential value between the $P_k$ and the $N_k'$;
  a multiplier, coupled to the first adder to multiply the differential value by a regressive parameter and output the result; and
  a second adder, coupled to the noise power register apparatus, for adding the $N_k'$ to the output of the multiplier to output the $N_k$.

4. The apparatus for estimating noise power in frequency domain according to claim 3, wherein the noise power register apparatus comprises a second multiplex unit coupled to the second adder, the first adder and registers to update the $N_k$ stored in the $K^{th}$ register based on a K value and output a $N_k$ value stored in the $K^{th}$ register to the second adder and the first adder.

5. The apparatus for estimating noise power in frequency domain according to claim 1, wherein the computation on the $N_k$ divides the $N_k$ by a gain controlling value and perform a logarithm transformation to output the logarithm value $L_k$ of the average noise power.

6. The apparatus for estimating noise power in frequency domain according to claim 1, wherein the channel is a transmission channel of Alternating Current (AC) power line communication network.

7. The apparatus for estimating noise power in frequency domain according to claim 1, wherein the apparatus for estimating noise power in frequency domain is applied to an orthogonal frequency division multiplex system.

8. The apparatus for estimating noise power in frequency domain according to claim 1, wherein the frequency domain signal accessing unit is a fast Fourier transform processor.

9. A method for estimating noise power in frequency domain, comprising:
  receiving a received signal from a channel, wherein the channel comprises M sub-channels,
  estimating a power of a signal of a $K^{th}$ sub-channel which is denoted by $P_k$ when no packet is being transmitted over the $K^{th}$ sub-channel;
  performing an average operation on the $P_k$ and a former average noise power in the $K^{th}$ sub-channel to output an average noise power of signal in the $K^{th}$ sub-channel which is denoted by $N_k$;
  dividing the received signal into a plurality of time intervals in time domain, and providing correspondence between time intervals and a plurality of noise configurations,
  providing a plurality of average noise power storage blocks corresponding to the noise configurations wherein each the average noise power storage blocks comprises M storage units; and
  judging first specific noise configuration corresponding to the received signal according to a first predetermined time interval corresponding to the received signal, and inputting the N value of the $K^{th}$ register in the $K^{th}$ storage unit of a first predetermined average noise power storage block corresponding to a first predetermined noise configuration.

10. The method for estimating noise power in frequency domain according to claim 9, further comprising:
  providing a noise power register apparatus comprising M registers; and
  inputting the average noise power of the $K^{th}$ sub-channel in the $K^{th}$ register.

11. The method for estimating noise power in frequency domain according to claim 9, wherein the step for performing an average operation for the $P_k$ and the former average noise power in the $K^{th}$ sub-channel to output the $N_k$ comprises:
  reading the former average noise power in the $K^{th}$ sub-channel of the $K^{th}$ register, denoted by $N_k'$; and
  performing an autoregressive operation on the $P_k$ and the $N_k'$ to output the $N_k$, wherein the autoregressive operation is expressed by the following equation:

$N_k=(1-\alpha) \times N_k' + \alpha P_k = (P_k - N_k') \times \alpha + N_k'$, wherein the $\alpha$ is an autoregressive parameter.

12. The method for estimating noise power in frequency domain according to claim 9, wherein the step for inputting the $N_k$ value of the $K^{th}$ register in the $K^{th}$ storage unit of the first specific average noise power storage block comprises:
  reading the $N_k$ value in the $K^{th}$ register;
  dividing the $N_k$ value by a gain controlling value and performing a logarithm transformation operation to acquire a logarithm value pf of an average noise power which is denoted by $L_k$; and
  storing the $L_k$ in the $K^{th}$ storage unit in the predetermined average noise power storage block.

13. The method for estimating noise power in frequency domain according to claim 12, further comprising:
  performing an exponential transformation operation on the $L_k$ stored in the $K^{th}$ storage unit in a second average noise power storage block corresponding to the second specific noise configuration when a second predetermined time interval next to the first predetermined time interval is changed from a first predetermined noise configuration to, a second predetermined noise configuration, and multiplying by the gain controlling value of the second predetermined time interval to reduce the average noise power $N_k$ in the $K^{th}$ sub-channel; and
  inputting the average noise power $N_k$ of the $K^{th}$ sub-channel in $K^{th}$ register of the noise power register apparatus.

14. The method for estimating noise power in frequency domain according to claim 9, wherein the channel is a transmission channel of Alternating Current (AC) power line communication network.

15. The method for estimating noise power in frequency domain according to claim 9, wherein the method for estimating noise power in frequency domain is applied to an orthogonal frequency division multiplex system.

16. The method for estimating noise power in frequency domain according to claim 9, wherein the step for estimating the power of signal over the $K^{th}$ sub-channel comprises accessing the power of signal over the $K^{th}$ sub-channel by a fast Fourier transformation of the received signal.

* * * * *